(12) United States Patent
Burkhardt

(10) Patent No.: US 11,841,904 B1
(45) Date of Patent: Dec. 12, 2023

(54) DETECTION OF COACTIVELY LINKED TOPOLOGICAL STRUCTURES IN NETWORKS AND DATABASES

(71) Applicant: The Government of the United States as represented by the Director, National Security Agency, Ft. George G. Meade, MD (US)

(72) Inventor: Paul Burkhardt, North Potomac, MD (US)

(73) Assignee: Government of the United States, as represented by the Director, National Security Agency

( * ) Notice: Subject to any disclaimer, the term of this patent is extended or adjusted under 35 U.S.C. 154(b) by 190 days.

(21) Appl. No.: 17/534,660

(22) Filed: Nov. 24, 2021

(51) Int. Cl.
*G06F 16/901* (2019.01)

(52) U.S. Cl.
CPC ................................ *G06F 16/9024* (2019.01)

(58) Field of Classification Search
None
See application file for complete search history.

(56) References Cited

U.S. PATENT DOCUMENTS

| | | | |
|---|---|---|---|
| 6,285,999 B1 | 9/2001 | Page | |
| 6,799,176 B1 | 9/2004 | Page | |
| 7,058,628 B1 | 6/2006 | Page | |
| 7,269,587 B1 | 9/2007 | Page | |
| 9,361,403 B2 * | 6/2016 | Hong | ...................... G06F 16/22 |
| 9,760,619 B1 * | 9/2017 | Lattanzi | ................ G06F 16/285 |
| 10,157,239 B2 | 12/2018 | Hong et al. | |
| 11,030,246 B2 * | 6/2021 | Rossi | ...................... G06N 5/022 |
| 11,120,023 B2 * | 9/2021 | Xia | ................... G06F 16/24549 |

OTHER PUBLICATIONS

Al Hasan, Mohammad & Vachik S. Dave, "Triangle Counting in Large Networks: A Review", Wiley Periodicals, appearing in WIRES Data Mining and Knowledge Discovery, vol. 8 (2018), 19 pages. (Year: 2018).*
Burkhardt, Paul, "Triangle Centrality", arXiv, submitted Sep. 10, 2021, 38 pages. (Year: 2021).*

* cited by examiner

*Primary Examiner* — Scott A. Waldron

(57) ABSTRACT

A method and system are provided for non-redundant detection of coactively linked nodes/data elements of a network or database topologically disposed in at least one triangularly linked arrangement. The network/database is topologically modelled as a graph having a plurality of vertices connected by edges. A neighborhood is generated in computer readable form for each connected vertex containing all other vertices directly connected thereto as neighbors. Connected vertex are ordered according to degree based on the number of neighbors. A reduced neighborhood is formed for each connected vertex by adaptively removing any lower order neighbor. Triangle neighborhoods are generated responsive to forward detections of common triangle neighbors through pairwise comparisons of reduced neighborhoods for connected vertices and each of their higher order neighbors, and reverse detection for certain connected vertices as triangle neighbors by lower ordered neighbors. Linked nodes/data elements are thereby screened in computationally mitigated manner to reveal coactive groupings.

20 Claims, 11 Drawing Sheets

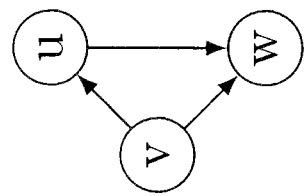
Fig. 3A: Degree-ordered triangle pattern

For a simple, undirected graph $G = (V, E)$ with $n = |V|$ vertices and $m = |E|$ edges where ....

- $N(v) = \{u \in V \mid (v, u) \in E\}$ neighborhood of $v$
- $d(v) = |N(v)|$ degree of $v$
- $N_\triangle(v) = \{u \in N(v) \mid N(u) \cap N(v) \neq \emptyset\}$ triangle neighborhood of $v$
- $N_\triangle^+(v) = \{v\} \cup N_\triangle(v)$ closed triangle neighborhood of $v$
- $\triangle(v)$ count of triangles with vertex $v$ (local count)
- $\triangle(G)$ count of triangles in $G$ (global count)
- $\pi : V \to 1, \ldots, n$ ordering on vertices such $\pi(u) < \pi(v)$ if $d(u) < d(v)$ or in the case of a tie then $u < v$.

Fig. 3B

| No. | | n (vertices) | m (edges) | $\triangle(G)$ (triangles) |
|---|---|---|---|---|
| 1 | Borgatti 2006 Figure 3 | 19 | 32 | 13 |
| 2 | Zachary's Karate club | 34 | 78 | 45 |
| 3 | Lusseau's Dolphin network | 62 | 159 | 95 |
| 4 | Kreb's 9/11 Hijackers network | 62 | 153 | 133 |
| 5 | Knuth's Les Miserables network | 77 | 254 | 467 |
| 6 | Kreb's US Political Books network | 105 | 441 | 560 |
| 7 | Newman's David Copperfield word adjacencies | 112 | 425 | 284 |
| 8 | Girvan-Newman Division IA College Football network | 115 | 613 | 810 |
| 9 | Watts-Strogatz C. elegans neural network | 297 | 2148 | 3241 |
| 10 | Adamic-Glance 2004 US Election Political Blogosphere | 1224 | 16,715 | 101,042 |
| 11 | Newman's Netscience Co-Authorship network | 1461 | 2742 | 3764 |
| 12 | Watts-Strogatz Western States Power Grid | 4941 | 6594 | 651 |
| 13 | SNAP ca-HepTh | 9875 | 25,973 | 28,339 |
| 14 | SNAP ca-AstroPh | 18,771 | 198,050 | 1,351,441 |
| 15 | SNAP email-Enron | 36,692 | 183,831 | 727,044 |
| 16 | Newman's Condensed Matter Physics network | 39,577 | 175,692 | 378,063 |
| 17 | SNAP web-Stanford | 281,903 | 1,992,636 | 11,329,473 |
| 18 | SNAP com-DBLP | 317,080 | 1,049,866 | 2,224,385 |
| 19 | SNAP com-Amazon | 334,863 | 925,872 | 667,129 |
| 20 | SNAP roadNet-PA | 1,088,092 | 1,541,898 | 67,150 |

Fig. 7: Test Graphs

US 11,841,904 B1

DETECTION OF COACTIVELY LINKED TOPOLOGICAL STRUCTURES IN NETWORKS AND DATABASES

FIELD OF THE INVENTION

The present invention is generally directed to processing-efficient detection of coactive links between elements of a network and database. More specifically, the present invention is directed to a method and system for computationally mitigated yet accurate detection of such coactive links through discriminant structures occurring in a given network or database when topologically modeled as a graph.

BACKGROUND OF THE INVENTION

Networks or databases are established to carry out wide ranging functions and achieve various goals in virtually all fields of endeavor. The design or analysis of these networks/databases is often facilitated by their modelling them on a structural level as graphs in which constituent vertices are linked together to represent functional interaction or association with one another. Certain topological features of graphs are recognized in the art to be especially useful in this regard, not the least of which is a triangularly linked topological arrangement, or triangle, formed amongst linked vertices. As the number of nodes or data elements in a modelled network/database may be quite large, however, the computational load to find and keep track of these triangle relationships may become quite unwieldy for anything but the simplest of applications.

Techniques to lower the computational load and thereby simplify processing to detect and count all triangles appearing in a given graph are known in the art. They include the use of hashing to produce hash tables which may be looked up to determine the existing triangle relationship amongst vertices. Using hash tables in this regard enables triangle neighborhoods of all vertices to be found in optimal expected time and linear space. But this is not without significant drawbacks. For instance, it is burdensome to rely consistently on hash tables, which must be re-built when there is any change to the graph subsequently. Hash tables are also prone to collisions when many data items that must be stored in the table are hashed to the same table key. Collisions in a hash table can severely degrade performance from constant-time to linear-time access in the worst-case. Moreover, it is not known in advance which data items result in collisions, which leads to non-deterministic runtime.

Strategies for mitigating collisions incur more overhead in processing and impair data locality resulting in many cache misses. For example, it is possible to maintain constant-time access in the worst-case by using a perfect hash table in which collisions are efficiently mitigated. But building a perfect hash table requires randomization; and, reliance upon hash tables in applications involving parallel computations introduce practical difficulties because updates and lookups must be synchronized to avoid race conditions.

Hence, there is a need to find the triangle neighborhood of each vertex of a graph in deterministic, optimal time and within linear space without the drawbacks of using hash tables. More specifically, there is a need for computationally mitigated detection of triangular topological structures occurring amongst elements of a given network or database. There is, therefore, a need for simple and efficient, yet reliable, detection of triangle neighbors and neighborhoods of vertices in a graph modelling the given network or database.

SUMMARY OF THE INVENTION

It is an object of the present invention to provide computationally mitigated detection of triangular topological structures occurring amongst elements of a given network or database.

It is another object of the present invention to provide simple and efficient, yet reliable, detection of triangle neighbors and neighborhoods of vertices in a graph modelling a given network or database.

These and other objects are attained in a method provided in accordance with certain embodiments of the present invention for non-redundant detection of nodes of a network topologically disposed in at least one triangularly linked arrangement. The method includes topologically modelling a network defined by a plurality of nodes selectively linked to one another in predetermined manner as a graph defined by a plurality of vertices correspondingly linked to one another by interconnecting edges. The vertices are individually designated by respective labels, wherein a connected vertex is defined by each vertex of the graph directly connected by an edge to at least one other vertex. Each neighbor of a connected vertex is defined by one other connected vertex directly connected by an edge thereto. A neighborhood generator is executed on a processor to generate a neighborhood dataset in computer readable form for each connected vertex, with the neighborhood dataset for a connected vertex containing all neighbors of that connected vertex in the graph. Each connected vertex has a degree defined according to the number of neighbors thereof for relative ordering by degree. A neighborhood reduction unit is executed on a processor to adaptively trim the neighborhood dataset of each connected vertex to remove therefrom any neighbor of lower order than the connected vertex, and thereby form a reduced neighborhood dataset for that connected vertex. A triangle neighbor detection unit is executed on a processor to form a plurality of triangle neighborhood datasets from the reduced neighborhood datasets which are populated with at least one neighbor. The triangle neighbor detection unit executes to pairwise compare a populated reduced neighborhood dataset of each connected vertex with each populated reduced neighborhood dataset of every higher order neighbor thereof, so as to detect any common neighbor in the respective reduced neighborhood datasets compared. Responsive to detection of a common neighbor in a pairwise comparison, the triangle neighborhood dataset is forwardly updated for each of the connected vertex and higher order neighbor in the pairwise comparison to include the detected common neighbor as a triangle neighbor. Responsive to such detection, the triangle neighborhood dataset is also updated for at least one of the connected vertex and higher order neighbor in the pairwise comparison to include the other as a triangle neighbor. The triangle neighbor detection unit also executes to reverse update the triangle neighborhood datasets for selected ones of the connected vertices to include therein every other connected vertex of lower order identifying the selected connected vertex as a triangle neighbor. Linked nodes of the network are thereby screened in computationally mitigated manner to reveal coactive groupings thereof.

In accordance with certain other embodiments, a system is provided for non-redundant detection of nodes of a network topologically disposed in at least one triangularly linked arrangement. The system includes a graphing unit configured to topologically model a network defined by a plurality of nodes selectively linked to one another in predetermined manner as a graph defined by a plurality of vertices correspondingly linked to one another by interconnecting edges. The vertices are individually designated by respective labels, wherein a connected vertex is defined by each vertex of the graph having a direct edge connection to at least one other vertex, and each neighbor of a connected vertex is defined by one other connected vertex directly connected by an edge thereto. A neighborhood generator executed on a processor and coupled to the graphing unit is configured to generate a neighborhood array in computer readable form for each connected vertex, where the neighborhood array for a connected vertex contains all neighbors of that connected vertex in the graph. Each connected vertex has a degree defined according to the number of neighbors thereof, and the neighbors within each neighborhood array are sorted for ordering by degree. A neighborhood reduction unit executed on a processor and coupled to the neighborhood generator is configured to adaptively filter the neighborhood array of each connected vertex to remove therefrom any neighbor of lower sorted order than that connected vertex, and thereby form a reduced neighborhood array for the connected vertex. A triangle neighbor detection unit executed on a processor and coupled to the neighborhood reduction unit forms a plurality of triangle neighborhood arrays from the reduced neighborhood arrays populated with at least one neighbor. The triangle neighbor detection unit includes a forward detection portion configured to pairwise compare a populated reduced neighborhood array of each connected vertex with each populated reduced neighborhood array of every higher order neighbor thereof, to detect any common neighbor in the respective reduced neighborhood arrays compared. Responsive to detection of a common neighbor in a pairwise comparison, the forward detection portion forwardly updates the triangle neighborhood array for each of the connected vertex and higher order neighbor in the pairwise comparison to include the detected common neighbor as a triangle neighbor. Also responsive to such detection, the forward detection portion forwardly updates the triangle neighborhood array of at least one of the connected vertex and higher order neighbor in the pairwise comparison to include the other as a triangle neighbor. The triangle neighbor detection unit includes a reverse detection portion configured to reverse update the triangle neighborhood arrays for selected ones of the connected vertices to include therein every other connected vertex of lower order identifying the selected connected vertex as a triangle neighbor. Linked nodes of the network are thereby screened in computationally mitigated manner to reveal coactive groupings thereof.

In accordance with certain additional embodiments, a method is provided for computationally mitigated detection of data elements of a database topologically disposed in at least one triangularly linked arrangement. The method includes topologically modelling a database as a graph, the database containing a plurality of data elements selectively linked to one another in predetermined manner, and the graph including a plurality of vertices correspondingly linked to one another by interconnecting edges where vertices are individually designated by respective labels. A connected vertex is defined by each vertex of the graph directly connected by an edge to at least one other vertex, and each neighbor of a connected vertex is defined by one other connected vertex directly connected by an edge thereto. A neighborhood generator is executed on a processor to generate a neighborhood dataset in computer readable form for each connected vertex, with the neighborhood dataset for a connected vertex containing all neighbors of that connected vertex in the graph and each connected vertex having a degree defined according to the number of neighbors thereof. A neighborhood reduction unit is executed on a processor to form a plurality of reduced neighborhood datasets from the neighborhood datasets, the neighbors within each reduced neighborhood dataset being sorted in order by degree, with any neighbors having matched degrees being ordered relative to one another according to the labels thereof. The neighborhood reduction unit adaptively filters the neighborhood dataset of each connected vertex to remove therefrom any neighbor of lower sorted order than the connected vertex in forming the reduced neighborhood dataset for that connected vertex. A triangle neighbor detection unit is executed on a processor to form a plurality of triangle neighborhood datasets from the reduced neighborhood datasets. The triangle neighbor detection unit executes to pairwise compare the respective reduced neighborhood datasets for each forwardly directed combination of each connected vertex with every neighbor thereof having a higher sorted order, for detection of any dataset intersection at a common neighbor. Responsive to detection of dataset intersection in a pairwise comparison, the triangle neighborhood dataset for each of the pairwise compared connected vertex and compared neighbor thereof is forwardly updated with each common neighbor as a triangle neighbor. Also responsive to such detection, the triangle neighborhood dataset of at least one of the pairwise compared connected vertex and compared neighbor is forwardly updated to include the other as a triangle neighbor. The triangle neighbor detection unit also executes to reverse update the triangle neighborhood datasets for selected ones of the connected vertices to include to include therein every other connected vertex of lower sorted order identifying the selected connected vertex as a triangle neighbor. Linked data elements of the database are thereby screened in processing reduced manner to reveal coactively related groupings thereof.

BRIEF DESCRIPTION OF THE DRAWINGS

Various aspects of the present invention, as well as the structural and operational features of certain exemplary embodiments disclosed herein, may be better understood by reference to the following description, taken in connection with the accompanying drawings, wherein like reference numerals and characters identify like elements, in which:

FIG. 3A is a schematic diagram illustrating the connection of low, middle, and high ordered vertices defining a degree-ordered triangle arrangement;

FIG. 3B is a chart referentially listing certain textual and symbolic nomenclature pertaining to various features/aspects of degree-ordered triangles and a graph containing such triangles;

DETAILED DESCRIPTION OF THE PREFERRED EMBODIMENTS

While the present invention may be embodied in various forms suitable for particular applications, there are shown in the accompanying drawings and described in illustrative detail herein specific embodiments which exemplify the principles of the invention as implemented for certain illustrative applications. It is to be understood that this collective disclosure is meant to be illustrative and exemplary, and is not intended to limit the invention to what is illustrated and described herein.

An example of a method and system implemented in accordance with an exemplary embodiment of the present invention are disclosed herein. In the interests of brevity and simplicity of description, the method and system are referred to herein collectively as a "detection system," unless otherwise noted.

The subject detection system is implemented in a computer device/system or host platform suitably equipped and configured to carry out the processes illustratively disclosed herein. The detection system employs one or more computer processors suitably programmed with software to, among other things, execute the topological modelling of a given network or database as a graph of edge connected vertices, the generation and storage of datasets, the forwardly directed and reverse directed comparative processing of such, and the interactive control thereof.

By way of background, a computer program which is executed by a microprocessor (or generally, "processor") based computer processing device is normally generated as source code, or a human-readable listing of instructions for the processor to carry out a certain process. The source code is compiled to corresponding object code that is represented in a machine language form readable to the particular type of CPU (central processing unit) employed by the processor. In some instances, the machine language (such as with Assembly/Assembler language), may employ certain notation or mnemonics so as to be in human readable form as well. The object code may be executable as is in some applications. But in many applications the object code must also be linked/paired by a suitably configured linker to one or more libraries of other object code files in order to be fully executable. The resulting executable code, or binary, is then available for execution by the processor to carry out the corresponding process.

Computer Processing Device/Host Platform Architecture Example

Figure 1:
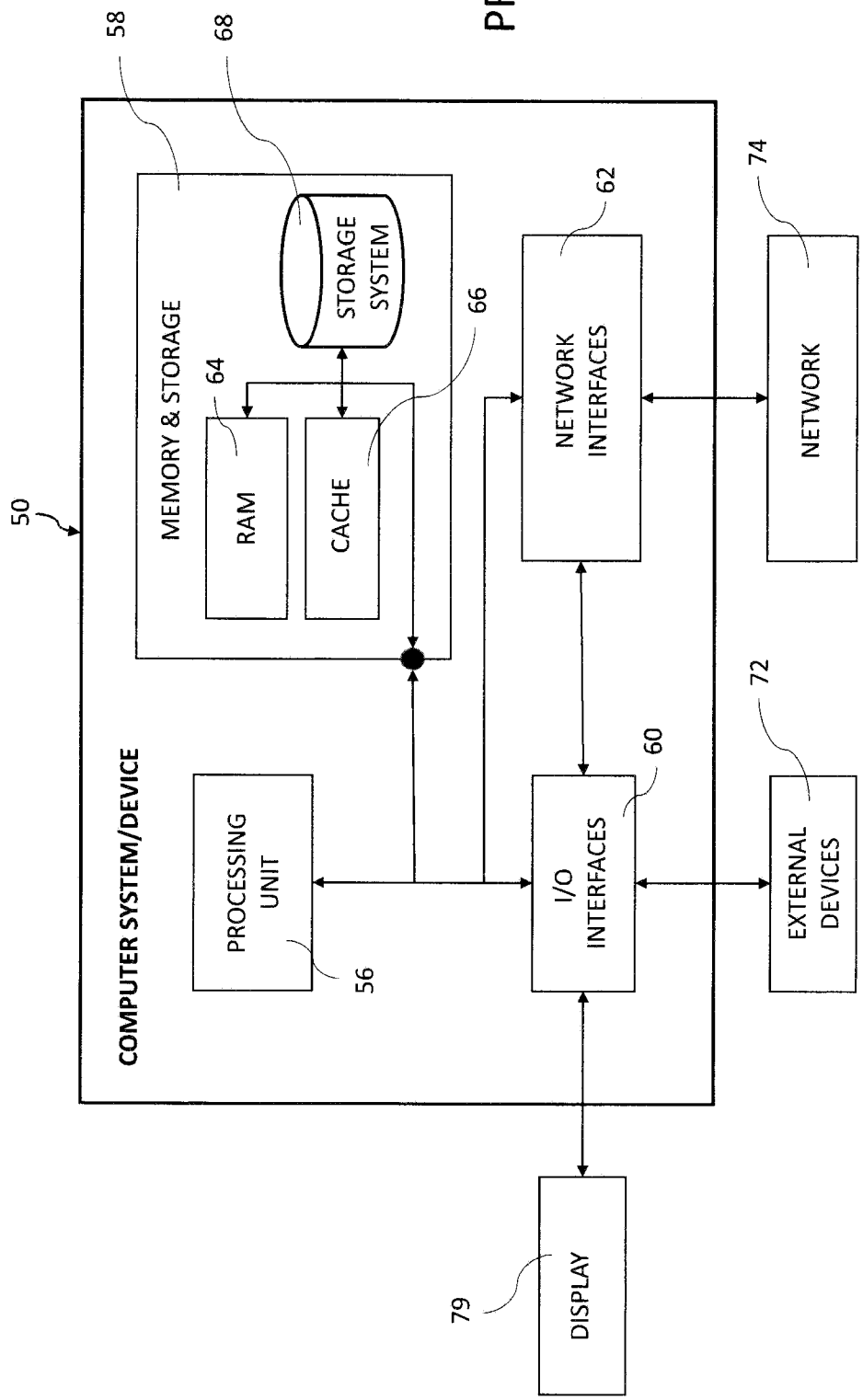
FIG. 1 is a schematic diagram illustrating the general architecture of a conventional processing system or device for various computer controlled equipment known in the art.

Executable code of a process may be accessed, temporarily loaded onto volatile memory, and run accordingly over one or more run sessions by a computer processing device 50 of any suitable type known in the art. FIG. 1 schematically illustrates an example of the general architecture typical of processing devices at the core of various computer controlled equipment known in the art. The computer processing device 50 is shown in general form with certain basic operational components operably coupled by system buses, interconnects, or other suitable communication links known in the art. The components generally include one or more central processing units (CPU's) 56, memory and storage units 58, input/output (I/O) interfaces 60, and network or other communication interfaces 62.

The memory and storage unit 58 includes volatile storage 64 typically in the form of random access memory (RAM) or the like operably coupled for access by a CPU 56. The memory and storage unit 58 may also include additional volatile storage in the form cache or other such auxiliary memory for higher speed retrieval of certain data. Such volatile storage is also referred to in connection with the particular embodiments disclosed herein generally as "volatile memory," or as "running memory" while serving to temporarily store the executable instructions and data required for a process during its execution. Volatile storage may be represented in certain cases (as in the embodiment illustrated herein) through a "virtual memory" whose address space maps to physical memory in any manner known in the art suitable for the given application. The memory and storage unit 58 may further include a nonvolatile storage system 68 in the form of solid state, magnetic/optical hard drive, or other such media for long term storage of data.

The CPU 56 communicates through the I/O interfaces 60 with respective external devices 72 such as such as keyboards, mouse, and other peripherals. The CPU 56 communicates through the network interfaces 62 with one or more networks 74 to which the computer processing device 50 may be operably coupled, such as Internet Protocol (IP) networks. A display and/or other user interface may be coupled through the I/O interface units for user interaction with the computer processing device 50.

Among other things, the computer processing device 50 may be employed in specialized computing devices such as embedded controllers, supervisory control and data access (SCADA) systems, and industrial control systems (ICS). The general architecture illustrated may be adapted by adding or deleting certain units or components to suit the needs of a particular embodiment and its intended application.

Topologically Modelled Detection of Coactively Linked Elements

The method and system disclosed herein—collectively "detection system"—generally provide for computationally mitigated detection of topological structures occurring amongst elements of a given network or database which serve as notable discriminants for coactive links between those elements. More specifically, the detection system provides for a highly efficient, processing load optimized detection of triangularly linked topological associations or arrangements between, for instance, certain nodes of a communication network or certain data elements of a database. Such triangularly linked elements tend to generally reflect special/notable relationships, mutual communication, cooperative interaction, close affiliation, influential association, or other such coactive disposition between the elements. In accordance with certain aspects of the present invention, the subject detection system simply yet reliably detects nodes or data elements linked in this manner, without incurring the exhaustive computational processing load heretofore required for the same.

A network, as referred to herein, may include various types of networks known in the art. They may include social or relational networks, semantic networks, biological or chemical networks, communication networks, functional/systematic networks, and others known in the art. A database may likewise include various types known in the art such as knowledge bases, relational databases, hierarchical databases, and others. Regardless of particular type and nature of the links between nodes, a network and the variously linked nodes which make up the network may be represented for analysis in computer readable form by one or more databases whose data elements are structured and variously linked to reflect the network. Conversely, particular instances of a database and its variously linked data elements may be deployed for certain intended applications as one or more networks of variously linked nodes.

In the illustrative embodiment disclosed, the detection system topologically models the given network or database (having elements that are linked together in predetermined manner) as a graph having a plurality of vertices correspondingly linked together by interconnecting edges. A triangle is essentially a fully-connected graph of three vertices, having both a 3-clique structure and a 3-cycle structure. As such, the topological occurrence of triangles in a graph indicate heightened cohesiveness due to interconnections among vertices. If an individual has two friends in a social network, for example, and these two friends are also friends with one another, the resulting trio exhibits more cohesiveness than the mere pairings of friends. And a concentration of triangles indicates increased cohesion, which yields increased network density in certain applications, and enables information and influence to spread more rapidly through the greater number of connected pathways made available thereby. Given a social network in which every pair of vertices are connected (the resulting graph being a clique), any member of the network would be capable of communicating directly with any other member in a single step. This would represent an ideal case, with maximum cohesion and the maximum number of triangles.

Figure 2:
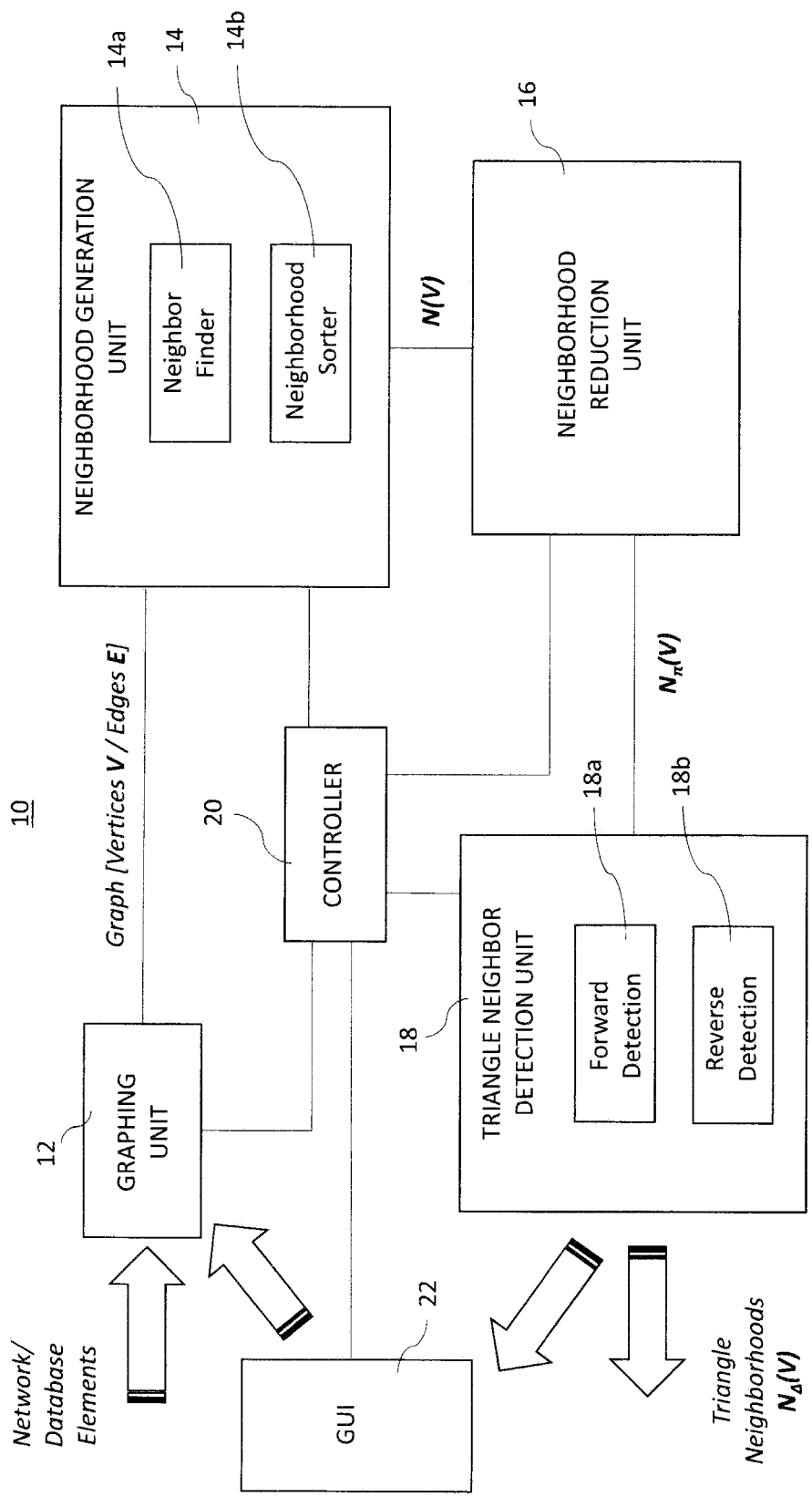
FIG. 2 is a schematic diagram showing certain functional blocks operably intercoupled in a detection system formed in accordance with one exemplary embodiment of the present invention.

Reference is now made to FIG. 2, which schematically illustrates certain portions of a detection system 10 implemented in accordance with one exemplary embodiment of the present invention. The detection system 10 is suitably configured for computationally mitigated, non-redundant detection of nodes or data elements that are topologically disposed in at least one triangularly linked arrangement with other such elements. The detection system 10 is preferably implemented in a computer processing device/system or host platform of the type generally illustrated in FIG. 1.

The detection system 10 generally includes a graphing unit 12, a neighborhood generation unit 14, a neighborhood reduction unit 16, and a triangle neighbor detection unit 18 operably coupled to one another as illustrated. Each of the units is preferably configured in software executed on one or more processors of the detection system 10 for cooperative operation, subject to a suitably configured controller 20. The system 10 preferably also includes a user interface, in the form of a suitably configured graphical user interface (GUI) 22, for example, and employs one or more computer readable memory devices (not shown) for both volatile and nonvolatile storage of data as required for particularly intended applications.

As illustrated, the graphing unit 12 is configured to receive data relating to the nodes or data elements (collectively "elements") of the network or database for the given application. The graphing unit 12 executes to topologically model the network/database in accordance with the received data, and defines the graph with a plurality of vertices linked to one another by edges to reflect the predetermined manner in which the network/database elements are linked. In a resulting graph, the vertices are individually designated by respective labels, consistent with the received data. Any vertex that is directly connected by an edge to at least one other vertex constitutes a connected vertex, and connected vertices which are directly connected to one another by an edge constitute neighbors of one another.

The neighborhood generation unit 14 is preferably configured to include a neighbor finder 14a which executes to identify the neighbor(s) for each connected vertex of the resulting graph. For each connected vertex, a neighborhood is collectively formed by its neighbors, and a degree parameter is defined according to the total number of neighbors making up its neighborhood. The neighborhood of each connected vertex is preferably represented as a dataset of sequential data elements each indicating a constituent neighbor, stored in a suitable computer readable memory array of sufficient length to hold the neighbors.

The neighborhood generation unit 14 is preferably also configured to include a neighborhood sorter 14b. Since each neighbor of a particular connected vertex is itself a connected vertex (linked to at least the particular connected vertex), every neighbor in the neighborhood dataset of the particular connected vertex is of a certain degree. The neighborhood sorter 14b executes to sort the neighbors within each connected vertex's neighborhood, preferably in ascending sequential order according to the degree. If neighbors within a neighborhood are of matching degrees, they are ordered relative to one another according to their respective labels.

The neighborhood reduction unit 16 operates on the neighborhoods found for the connected vertices, effectively reducing each neighborhood to either only contain or only keep track of those neighbors, if any, ordered higher than the connected vertex of the neighborhood. That is, the neighborhood of each connected vertex is adaptively trimmed to remove therefrom any neighbor of lower order than the connected vertex, and thereby form a reduced neighborhood dataset for such connected vertex.

The triangle neighbor detection unit 18 then operates on the reduced neighborhoods still containing at least one neighbor to detect for each connected vertex those neighbors, if any, which form a triangular arrangement therewith. The triangle neighbor detection unit 18 preferably executes a set intersection operation to generate triangle neighborhood datasets (if any) for the connected vertices upon comparatively processing reduced neighborhoods of connected vertices populated with at least one neighbor. Other suitable techniques known in the art for comparative processing may be employed to generate triangle neighborhood datasets. Where triangular arrangements of vertices are detected, cumulative counts are preferably updated for triangles involving the respective vertices, as well as for all triangles occurring overall in the graph G.

The triangle neighbor detection unit 18 is preferably configured to include both forward detection processing 18a and reverse detection processing 18b. Forward detection 18a preferably carries out pairwise comparisons of such reduced neighborhoods between each connected vertex having a reduced neighborhood that is populated on the one hand, and every neighbor of higher order also having a populated reduced neighborhood on the other hand. The pairwise comparisons identify any common neighbors found in the respective reduced neighborhoods of the compared vertices (the connected vertex and its higher order neighbor).

Conveniently, the reduced neighborhood of a connected vertex is populated with neighbors which are only higher in order than the connected vertex. So the pairwise comparison may be carried out fully for each connected vertex simply with respect to each neighbor within its reduced neighborhood, and of those neighbors only those also having a non-empty (populated) reduced neighborhood.

A triangle neighborhood is preferably maintained for each of the vertices (connected vertex and higher order neighbor) being pairwise compared in reduced neighborhoods, as a dataset containing the triangle neighbors identified for each vertex compared in a suitable computer readable memory array. Preferably, the triangle neighborhood and reduced neighborhood datasets of a connected vertex are configured with matching indices for addressing the same neighbor appearing in both. A neighbor occupying a certain ordered position within the reduced neighborhood of a particular connected vertex would, upon identification as a triangle neighbor of that particular connected vertex, then occupy the same ordered position within its triangle neighborhood.

Upon detection of a common neighbor in a pairwise comparison, the triangle neighborhood dataset (or a detection array tracking common neighbors) for at least the connected vertex (having lower order than the neighbor compared with) in the pairwise comparison is forwardly updated to include the higher order neighbor (whose reduced neighborhood is compared with) and the detected common neighbor as triangle neighbors. Preferably, the triangle neighborhood dataset (or detection array) for the higher order neighbor involved in the pairwise comparison is also updated to conversely include the connected vertex as well as the common neighbor as triangle neighbors. This update/tracking of the higher order neighbor's triangle neighborhood may alternatively be left to reverse detection processing 18b in certain other embodiments.

As forward detection 18a for connected vertex pairs is oriented forward (or upward in order), it looks from lower to higher ordered vertices for any set intersections between their respective reduced neighborhood datasets. As such, forward detection 18a fails to fully capture any triangle neighbors for the connected vertex having the highest order within a triangle—since its neighbors in that triangle are by definition lower in relative order, and its reduced neighborhood is necessarily incomplete as to that triangle. The triangle neighbor detection unit 18 accordingly includes reverse detection 18b which carries out reverse updating of the triangle neighborhood datasets for certain selected ones of the connected vertices, including but not necessarily limited to any connected vertex of highest order in any triangle occurring in the graph G. Reverse detection 18b compares the reduced neighborhood of the selected one of the connected vertices with the triangle neighborhood or detection array (as generated by forward detection 18a) of every other connected vertex of lower order. Any lower ordered connected vertex whose triangle neighborhood identifies the currently selected connected vertex as a triangle neighbor is conversely identified as a triangle neighbor of that selected connected vertex.

Schematically Illustrated Embodiment

Referring to FIG. 3A, a degree-ordered triangle formed by three connected vertices {v, u, w} is schematically represented for illustrative description. FIG. 3B provides an illustrative listing of various terms, symbols, nomenclature, and other such notations pertaining to symbol-based representations of properties, characteristics, parameters, and other features/aspects of such degree-ordered triangles defined in the context of the topologically modelling graph G in which they are formed.

The degree-ordered triangle of FIG. 3A is shown in isolation for clarity of illustration, but would be part of the larger graph G having other vertices (some of which may be connected to one or more other vertices and others may not be connected to any other vertex). In this example, each of the vertices constitutes a connected vertex, where the order of vertex v is less than the order of vertex u, and the order of vertex u is less than the order of w. Vertices v, u, w would accordingly constitute the low, middle, and high vertices of the degree-ordered triangle shown. As used herein, unless otherwise noted the labels v, u, w (and also x) denote variable labels referring to the ordered vertices of a degree-ordered triangle (one of potentially many occurring in the graph G), rather than absolute labels for particular vertices uniquely referencing each within the graph G.

Taken in turn, connected vertex v includes amongst the neighbors in its overall neighborhood vertices u and w, both of which are of higher order. Connected vertex u includes amongst the neighbors in its overall neighborhood vertex v which is of lower order and w which is of higher order. Connected vertex w includes amongst the neighbors in its overall neighborhood vertices v and u, both of which are of lower order.

Connected vertex v would then include amongst the higher order neighbors in its reduced neighborhood both vertex u and vertex w. Connected vertex u would include amongst the higher order neighbors in its reduced neighborhood just vertex w. Connected vertex w would not include either of the vertices v or a amongst the higher order neighbors in its reduced neighborhood. Indeed, if vertex w were the highest order vertex in all of graph G, then it would be without any higher ordered neighbors, and its reduced neighborhood would not be populated with any neighbors.

In the forward oriented triangle detection of the disclosed embodiment, only the higher-ordered neighbor lists (reduced neighborhood) $N_\pi$ are comparatively examined for each connected vertex v and each of its higher-ordered neighbors u in that list (reduced neighborhood) $N_\pi(v)$ to determine if connected vertex v and its neighbor a are together disposed in a triangle. Preferably, only non-empty reduced neighborhoods $N_\pi$ which are populated with at least one neighbor are comparatively examined with respect to one another. This forward oriented detection helps to optimize processing performance/efficiency. The challenge is that a triangle may be seen in this orientation only from the perspective of the lowest order vertex of the triangle. For example, in the degree-ordered triangle formed by vertices {v, u, w} as shown, the triangle is not visible from the perspective of the middle connected vertex u, since it does not contain any lower neighbor, such as vertex v, in its own reduced neighborhood $N_\pi(u)$ of higher-ordered neighbors. Nor would the triangle be visible from the perspective of the high connected vertex w, since it does not contain either vertex v or u in its reduced neighborhood $N_\pi(w)$ of higher-ordered neighbors.

Hence, the existence of triangle {v, u, w} may only be obtained reliably from the perspective of connected vertex v. Upon forward detection of the triangle {v, u, w} from that perspective (upon comparison of reduced neighborhoods $N_\pi(v)$ and $N_\pi(u)$ of the connected vertices v and u for any set intersection), the detection system 10 may inform/update the triangle neighborhoods $N_A(v)$, $N_A(u)$ of connected vertices v and u to identify vertex w as a triangle neighbor in both. The detection system 10 could also inform/update the triangle neighborhoods $N_A(v)$, $N_A(u)$ of connected vertices v and u that they are triangle neighbors of one another. But suppose a different triangle {v, x, w} exists in the graph G where the degree of connected vertex v is less in degree (and order) than connected vertex x, and the degree of connected vertex x is less in degree and order than connected vertex w. This different triangle would also be discovered from the perspective of connected vertex v; and, the detection system 10 might redundantly inform/update the triangle neighborhood $N_A(v)$ of connected vertex v again that vertex w is its triangle neighbor. This duplicated, redundant update is preferably avoided to minimize both processing time and memory space consumption.

In accordance with certain aspects of the present invention, the detection system 10 avoids this redundancy by, among other things, computing the set intersection between the higher-ordered (reduced) neighborhoods $N_\pi$ of only the low and middle vertices in a triangle. Thus for each ordered triangle {v, u, w}, only the reduced neighborhood set intersection between the low and middle connected vertices v and u is preferably computed, leaving out intersections between connected vertices v and w, or between connected vertices u and w. For example, limiting the set intersection comparisons to connected vertices whose reduced neighborhoods are actually populated with at least one higher ordered neighbor and updating the triangle neighborhood of only the connected vertices actually compared upon detection of an intersecting vertex, would effectively avoid errant or duplicative neighborhood set intersection with a highest ordered triangle vertex. Triangle neighborhoods for each such highest order triangle vertex are captured after the triangle neighborhoods for its low and middle order triangle vertices are determined.

Figure 4A:
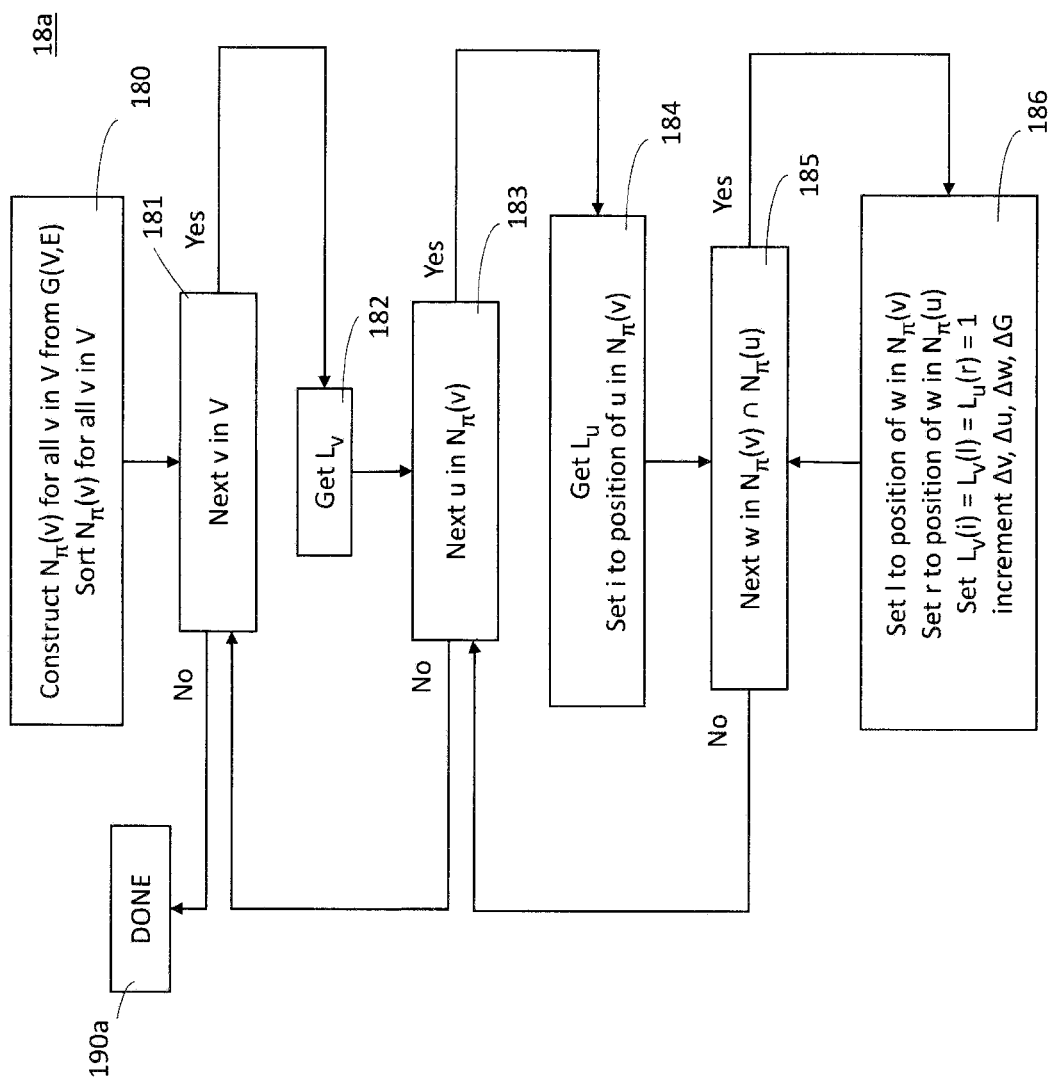
FIG. 4A is a schematic diagram showing an illustrative operational flow of certain operations or processes within a portion of the embodiment shown in FIG. 2.
Figure 4B:
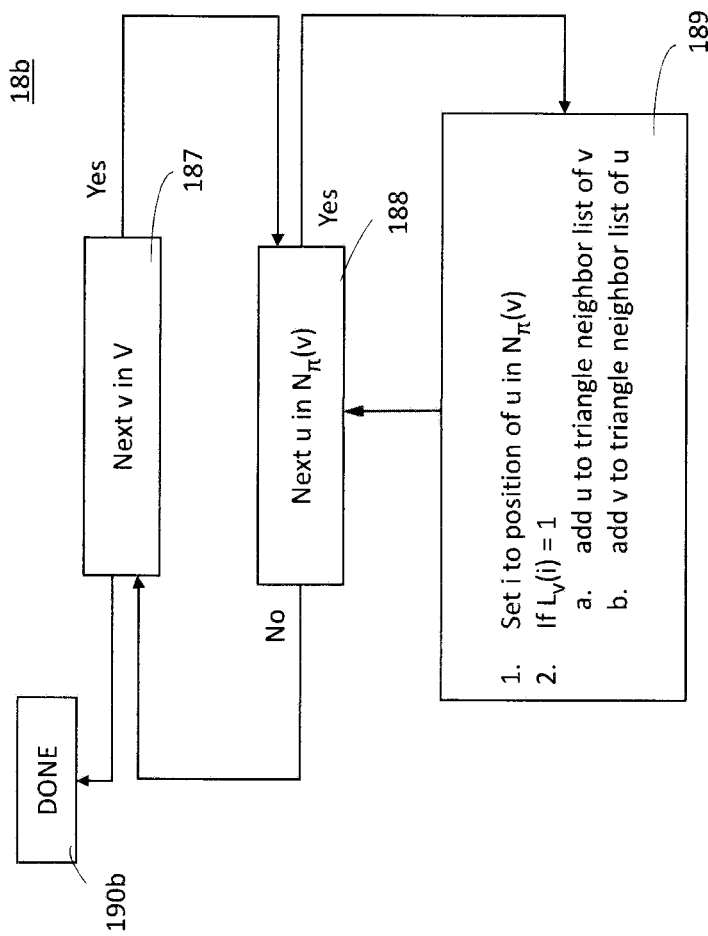
FIG. 4B is a schematic diagram showing an illustrative operational flow of certain operations or processes within another portion of the embodiment shown in FIG. 2.

Referring now to FIGS. 4A-4B, certain portions of the triangle neighbor detection unit 18 of detection system 10 are shown as implemented in accordance with one exemplary embodiment of the present invention. FIGS. 4A-4B schematically illustrate the functional flow between programmably implemented modules, executable tasks, automated functions, or other such operational portions preferably implemented to carry out forward detection processing 18a and reverse detection processing 18b, respectively, during system operation. For purposes of explanation in FIGS. 4A-4B, the full set of all connected vertices is denoted V, while individual connected vertices within the full set V are denoted by the variable v. In the event a triangle containing the connected vertex v as the lowest ordered vertex is found, the middle neighbor of vertex v in that triangle is denoted by the variable u, and the high ordered neighbor of vertex v in that triangle is denoted by the variable w. Consistent with FIG. 3A, more than one triangle may be found amongst the connected vertices V, but the degree-ordered vertices of each triangle are thus referenced for purposes of explanation by these relatively ordered variables {v, u, w} and not necessarily by the vertices' actual labels which are unique and distinct for each in a given application.

The triangle neighbor detection unit 18 executes the detection portions 18a, 18b to find each degree-ordered triangle {v, u, w} formed by a different combination of connected vertices only once, and to accordingly populate the triangle neighborhood datasets/arrays of the pertinent connected vertices with minimal redundancy in processing. As illustrated in FIG. 4A, the reduced neighborhoods $N_\pi$ for all connected vertices V of the graph G are received at block 180 from the neighborhood generation unit 14. The reduced neighborhood $N_\pi(v)$ for each connected vertex v includes only those neighbors of vertex v which are higher in order than vertex v. So the reduced neighborhood $N_\pi(v)$ of a connected vertex v holds only those neighbors of v that have either higher degree than v, or in the case of the same degree, have actual vertex labels that are higher in sorting order than the actual vertex label of connected vertex v. Preferably, the neighbors within each reduced neighborhood $N_\pi$ are sorted in ascending order.

At block 181, 182, a detection array $L_v$ is suitably established for a first of the connected vertices v. This begins preferably with the connected vertex v of lowest order, and progresses in subsequent iterations for each remaining connected vertex of next higher order having a populated reduced neighborhood $N_\pi$. Detection array $L_v$ is preferably formed, for instance, as an array of memory/storage locations or cells equivalent in size to the reduced neighborhood $N_\pi(v)$ of the given connected vertex v, with the cells matching in index to the ordering of neighbors in the reduced neighborhood $N_\pi(v)$.

Structuring the detection arrays $L_v$ for the connected vertices v of Vas storage arrays is preferable though not necessary. In certain alternate embodiments, the detection arrays $L_v$ may be established as a linked list, or may be established in any other suitable form known in the art. Regardless of the structure employed, however, the local position of each higher-ordered neighbor of a connected vertex v within its detection array $L_v$ is kept consistent with the neighbor's local position within the reduced neighborhood $N_\pi(v)$ of that connected vertex v for simplicity in tracking the neighbor's status as a triangle neighbor or not.

The contents of the detection array $L_v$ cells are preferably initialized to 0 or other low/null value as prescribed by the particularly intended application. When subsequently updated, the cells may store a binary digital bit value, an integer value, or some other value of suitable type, according to the requirements of the particularly intended application. In the illustrated embodiment, since the detection array $L_v$ cells are indexed to match the ordered neighbors of the reduced neighborhood $N_\pi(v)$, the correspondingly indexed cell for a particular neighbor in the detection array may be set to a high digital bit value 1 upon detection of that neighbor as a triangle neighbor of connected vertex v. An inherent advantage of this approach is that any redundant detection of the same neighbor as a triangle neighbor is rendered harmless since its corresponding cell in the detection array $L_v$ would be set already high and remain unchanged. That is, duplication of triangle neighbors is not possible in the illustrated embodiment because detection arrays L do not change in size, and any triangle neighbor detected more than once results in the idempotent operation of overwriting a digital bit value 1 with 1.

At blocks 183, 184, a similar detection array $L_u$ is established for the first of the higher ordered neighbors in the reduced neighborhood $N_\pi(v)$ of the given connected vertex v. The size and indexing of cells in the detection array $L_u$ is configured to match those of the reduced neighborhood $N_\pi(u)$ of that neighbor (as generated with respect to that neighbor u as the connected vertex of reference). The contents of the detection array $L_u$ cells are also initialized preferably to a digital null value.

The flow then proceeds to block 185, where a set intersection process is preferably carried out to find any common neighbors between a connected vertex and each of its higher ordered neighbors. The current connected vertex v and its higher order neighbor u (as a connected vertex in its own right) are pairwise compared via their reduced neighborhoods $N_\pi(v)$ and $N_\pi(u)$ for any intersection at a common neighbor w. If a common neighbor w is detected, the detection array $L_v$ of at least the current connected vertex v is updated at block 186 to set the cells at position/address indices i and l (corresponding to the positions of compared neighbor u and common neighbor w within the current connected vertex v's reduced neighborhood $N_\pi(v)$) to a digital high bit value. This marks vertices u and w as triangle neighbors of connected vertex v in the detection array $L_v$.

Preferably, the detection array $L_u$ of the higher ordered neighbor vertex that is compared with (namely, the current neighbor u) is also updated at block 186. The cells of that detection array $L_u$ at position/address index r (corresponding to the position of the common neighbor w within the reduced neighborhood $N_\pi(u)$ of the neighbor u) is set to a digital high bit value. This marks vertex w as a triangle neighbor of the lower order vertex u also. In addition, cumulative counts $\Delta v$, $\Delta u$, $\Delta w$ of triangles detected which involve the vertices v, u, w, as well as a cumulative global count $\Delta G$ of all triangles detected in the graph G are preferably also incremented at block 186 in response to such triangle detection.

The operations of blocks 184, 185, 186 are carried out iteratively for every higher ordered neighbor u in the reduced neighborhood $N_\pi(v)$ of the current connected vertex v. Once all higher order neighbors u are exhausted, the flow proceeds back to block 181 for iterative execution of the operations at blocks 182-186 for each of the remaining connected vertices v in the set V having a reduced neighborhood $N_\pi(v)$ populated with one or more higher ordered neighbors. For each iteration, the connected vertex of next higher order is taken as the current connected vertex v indicated in FIG. 4A. Once the iterative operations are completed, the flow proceeds to block 190a indicating as much.

Forward detection 18a results in pairwise comparison for each low and middle vertex of any triangle occurring in the graph G—namely, every connected vertex v in V having a populated reduced neighborhood—each with every one of its neighbor vertices u having a higher order than itself and a populated reduced neighborhood, for a possible triangle. If any pairwise comparison indicates that a triangle exists, then the compared vertices v, a would have a common high ordered neighbor w appearing in both their reduced neighborhoods $N_\pi(v)$ and $N_\pi(u)$. The detection arrays $L_v$, $L_u$ as cumulatively updated for the compared vertices v, u through this forward detection process keep track of the vertices' detected triangle neighbors. Where a separate dataset or array is maintained for the triangle neighborhood $N_A$ of a connected vertex apart from its detection array L, the triangle neighborhood $N_A$ is updated consistent with (or paired with) the detection array L.

Note again that the reduced neighborhoods $N_\pi(v)$ and $N_\pi(u)$ of pairwise compared vertices v, u include only neighbors that are higher in order than those vertices. So the pairwise comparisons of forward detection processing 18a, indeed, look forward (towards neighbors of higher ascending order) from the low and middle ordered vertices of each triangle to be detected. Although the triangle neighborhoods $N_A(v)$, $N_A(u)$ of the lower and middle order vertices v, u are both preferably updated (or at least tracked through their detection arrays $L_v$, $L_u$) to include a higher order neighbor(s) when any degree-ordered triangle is detected between them, the triangle neighborhood $N_A(w)$ of the high order vertex w is not correspondingly updated or tracked with either of those lower and middle vertices. (This is the case also for the middle vertex u as to the low vertex v in the disclosed embodiment, as its triangle neighborhood $N_A(u)$ is not concurrently updated with the low vertex v upon forward detection of a triangle therewith, though updated with the high vertex w.)

Reverse detection processing 18b is therefore carried out, as illustrated for example in FIG. 4B. At blocks 187, 188 an iterative check is made of every higher order neighbor u in the reduced neighborhood $N_\pi(v)$ of each connected vertex v for its (neighbor u's) appearance in the triangle neighborhood of that connected vertex v. This check is indicated at block 189, where the higher order neighbor's cell position i in the detection array $L_v$ of the connected vertex v is checked for positive indication of vertex u being a triangle neighbor (for example, by a digital high value 1). If so, the triangle neighborhood (or list) $N_A(u)$ of the higher order neighbor vertex u itself is updated accordingly—to conversely include its lower vertex v as a triangle neighbor. If not already done, the triangle neighborhood (or list) $N_A(v)$ of vertex v is preferably also updated to include vertex u as its triangle neighbor. Once all the connected vertices v of V and their higher order neighbors u are iteratively exhausted and reverse detection is thereby complete, the flow proceeds to block 190b indicating as much.

In this manner, the triangle neighborhoods (lists) $N_A$ for each connected vertex v selected in V is reverse updated to include therein every other connected vertex of lower order identifying the selected connected vertex v as a triangle neighbor. If until this point (before reverse detection processing) only the detection arrays L were maintained and updated for the connected vertices to track triangle neighbor detection, the reverse detection process 18b serves as an overall process for constructing the triangle neighborhoods $N_A(v)$, if any exist, for every connected vertex v in V. The process serves to symmetrically pair the triangle neighborhoods $N_A$ with corresponding detection arrays L of the connected vertices, ensuring that each endpoint of a degree-ordered triangle edge is included in the pairing, and thereby completing the list of triangle neighbors for every connected vertex v in V.

In certain alternate embodiments and applications, reverse detection processing 18b may be streamlined by executing the iterative check at block 187-189 (of higher order neighbors u for appearance in the triangle neighborhood of a given connected vertex v) only for viable connected vertices v, and only on viable ones of their higher order neighbors u. More specifically, the check may be reserved only for those connected vertices v having non-empty triangle neighborhoods $N_A(v)$ (containing at least one triangle neighbor after forward detection processing 18a). And of the higher order neighbors u of such connected vertices v, the check may be executed on only those higher order neighbors u which have actually been detected as a triangle neighbor at least once (and thereby entered in the triangle neighborhood of at least one connected vertex v) during forward detection processing 18a. The efficiencies gained could be outweighed by the additional measures required to monitor/track vertex viabilities, however, and the usefulness of such streamlining of the check will depend on the particularities of the intended application.

Figures 5A, 5B:
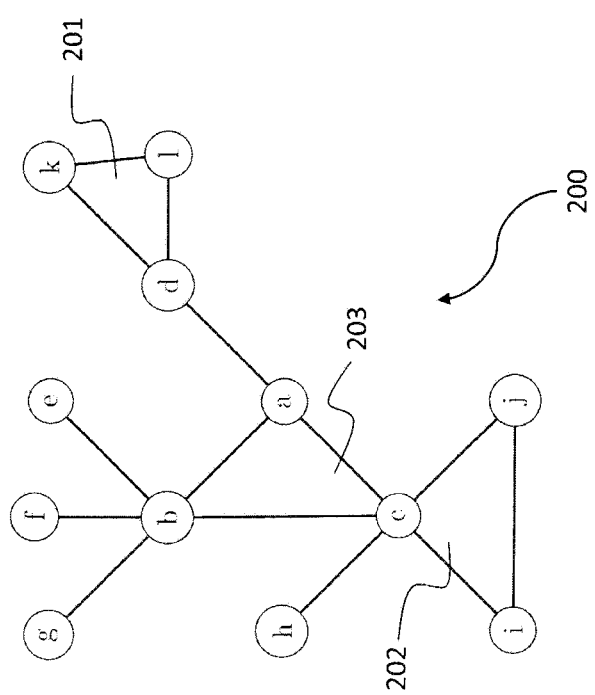
FIG. 5A is a schematic diagram illustratively showing a sample graph having a plurality of degree-ordered triangles defined therein.
FIG. 5B is a schematic diagram illustratively showing certain neighborhood and detection arrays for one vertex of the sample graph as triangle neighbors thereof are detected during operation of the embodiment shown in FIG. 2.

FIG. 5A illustrates one example of triangle neighbor detection 18 as executed upon a sample graph 200. Graph 200 includes connected vertices labelled a-l which are linked by edges as shown. Three triangles occur in graph 200, namely triangle 201 (formed as Δk-l-d), triangle 202 (formed as Δi-j-c), and triangle 203 (formed as Δa-b-c). An ordered listing of the labelled vertices, their degrees D, neighborhoods N, and reduced neighborhoods $N_\pi$ as derived from the graph 200 are shown in Table 1 below. The vertices v in Table 1 are listed in sorted ascending order, with the alphabetic order of vertex labels preferably resolving any ties between vertices v of same degree D in this particular example. The listing illustrates triangle neighborhoods $\rightarrow N_\pi$ of the vertices as they result from forward detection 18a, then the same triangle neighborhoods $\leftarrow N_\pi$ as they result upon completion of reverse detection 18b.

TABLE 1

Example: Triangle Neighborhoods Detected

| v Label | D Ordered | N(v) | $N_\pi(v)$ | $\rightarrow N_A(v)$ | $\leftarrow N_A(v)$ |
|---|---|---|---|---|---|
| e | 1 | {b} | {b} | { } | { } |
| f | 1 | {b} | {b} | { } | { } |
| g | 1 | {b} | {b} | { } | { } |
| h | 1 | {c} | {c} | { } | { } |
| i | 2 | {j, c} | {j, c} | {j, c} | {j, c} |
| j | 2 | {i, c} | {c} | {c} | {i, c} |
| k | 2 | {l, d} | {l, d} | {l, d} | {l, d} |
| l | 2 | {k, d} | {d} | {d} | {k, d} |
| a | 3 | {d, b, c} | {d, b, c} | {b, c} | {b, c} |
| d | 3 | {k, l, a} | { } | { } | {k, l} |
| b | 5 | {e, f, g, a, c} | {c} | {c} | {a, c} |
| c | 5 | {h, i, j, a, b} | { } | { } | {i, j, a, b} |

As shown for triangle 201, the reduced neighborhood $N_\pi(k)$ of the low vertex k in that triangle 201 contains its higher order neighbors {l, d}, while $N_\pi(l)$ of the middle vertex l includes only its higher order neighbor {d}. Upon forward triangle detection processing from vertex k, a set intersection is detected with its higher order neighbor l, specifically upon detection of the common triangle neighbor d. But none is detected with its higher order neighbor d, since the reduced neighborhood $N_\pi(d)$ is empty of any higher order neighbors. There is no forward detection processing to be done from vertex l since its only higher order neighbor is vertex d, which, again, has an empty reduced neighborhood. Consequently, the triangle neighborhoods $N_A(k)$, $N_A(l)$ of the low and middle vertices k, l are forward updated (denoted by the mark $\rightarrow$) to include their common neighbor d, and the target neighborhood of vertex k is updated with its higher order neighbor l. The triangle neighborhood $N_A(d)$ of the high vertex d remains empty at this point, much like its reduced neighborhood $N_\pi(d)$, since it has no higher order neighbor with which to pairwise compare reduced neighborhoods.

Upon execution of reverse detection 18b, however, the triangle neighborhood $N_A(d)$ of the high vertex d is reverse updated (denoted by the mark $\leftarrow$) based upon its appearance as a triangle neighbor of lower order neighbors k and l—to include both those lower neighbors k, l. Thus, following reverse detection 18b, the triangle neighborhoods $N_A(k)$, $N_A(l)$, $N_A(d)$ of all three vertices defining triangle 201 each properly include the other two vertices as detected triangle neighbors.

Note that if the triangle neighborhood $N_A(l)$ of the middle vertex l in this case had not been forward updated to include the common vertex d (by virtue of the set intersection carried for vertex k with its higher order neighbors), $\rightarrow N_A(l)$ would have remained empty following forward detection 18a. During reverse detection 18b, $\leftarrow N_A(l)$ would have been populated with its lower vertex k, but not with its higher vertex d. Nor would the triangle neighborhood $N_A(d)$ of the high vertex d then be reverse updated to include the middle vertex l, as it should. Hence, the need in this case for the forward updating of $\rightarrow N_A(l)$ upon set intersection with middle vertex l during vertex k's forward detection, in addition to updating its own $\rightarrow N_A(k)$ at that point.

The detection of triangle neighborhoods for the vertices making up triangle 202 progresses in similar manner for each of its triangle vertices i, j, c. In triangle 203, however, the detection involves multiple vertices b, c each having relatively high order than vertex a. In this case, the reduced neighborhood $N_\pi(a)$ of the low vertex a contains the higher order neighbors {d, b, c}, while the reduced neighborhood $N_\pi(b)$ of middle vertex b contains only higher order neighbor {c} and the reduced neighborhood $N_\pi c$) of high vertex c is empty. As such, the triangle neighborhood $\rightarrow N_A(c)$ of the high vertex remains empty upon forward detection processing 18a, although the triangle neighborhoods $\rightarrow N_A(a)$, $\rightarrow N_A(b)$ of the low and middle vertices a, b are forward updated to properly contain common high vertex c at this point.

It is only upon reverse detection processing 18b, that the high vertex's triangle neighborhood $\leftarrow N_A(c)$ is populated with its lower order neighbors. In this case, the triangle neighborhood $\leftarrow N_A(c)$ is reverse updated to include the low and middle vertices a, b of triangle 203. This adds to the low and middle vertices i, j of triangle 202 during reverse detection processing 18b for that triangle. Note that upon forward detection 18a, the triangle neighborhoods $\rightarrow N_A(j)$, $\rightarrow N_A(l)$, $\rightarrow N_A(b)$ of middle triangle vertices do not include their lower order triangle neighbors, since the low triangle vertices are not 'visible' from their perspectives during forward detection. Upon execution of reverse detection 18b, however, their triangle neighborhoods $N_A(j)$, $N_A(l)$, $N_A(b)$ are reverse updated to include the respective lower order neighbors i, k, a based upon appearances as triangle neighbors thereof.

As noted in preceding paragraphs, reverse detection processing 18b may be streamlined in certain alternate embodiments of the detection system 10. As applied to this example, vertices e, f, g, h, d, c would not qualify viable connected vertices v for purposes of the iterative check (at blocks 187-189) of reverse detection processing 18b, since their target neighborhoods $\rightarrow N_A$ remain empty upon forward detection. And since vertices e, f g, h, i, k, a do not appear in any triangle neighborhood $\rightarrow N_A$ of any other connected vertex upon forward detection, they would not qualify as viable higher order vertices u for purposes of the iterative check. Unnecessary portions of the iterative check involving these vertices may then be avoided during execution. Whether or not this streamlined approach nets overall efficiencies, however, will depend on such factors as the scope and size of network/database, the available processing and memory/storage resources, and the like in the particularly intended application.

Turning to FIG. 5B, the various neighborhood and detection arrays $N(b)$, $N_A(b)$, $N_A(b)$, $L_b$ are illustrated by way of example, for a sample connected vertex b listed in Table 1. As shown, the indices for tracking the positions/addresses of vertex b's individual neighbors are preferably kept consistent through the different arrays, in particular between the reduced neighborhood and detection arrays $N_A(b)$ and $L_b$. For example, both these arrays are of matching cell size, with the cell index for neighbor c remaining cell location 4 in both arrays. Keeping these arrays consistent in size and relative neighbor positions in such manner simplifies the tracking and pairing of particular triangle neighbors, distinct from other non-triangle neighbors, through the triangle detection process.

Optimal Processing Runtime

The detection system 10 is thus configured to provide simple and efficient yet exhaustive detection of triangle neighbors for vertices within a graph G, and to do so in optimal deterministic time and linear space using only simple arrays. The detection system 10 is configured in this regard to minimize the computations needed, such that optimal processing runtime (that is consistent and predictable given like conditions) is substantially achieved without resort to the use of hash tables or other techniques known in the art.

Triangle neighbors may be detected by methodically and directly stepping through every edge, or through every vertex of the graph G. For example, all triangles of G may be identified by computing the set intersection between the neighborhoods of endpoint vertices for every edge. Similarly, triangles can be found from every vertex by checking if the unique pairs of neighbors are adjacent. Using either direct approach is inefficient, and would take approximately, in big O notation, $O(m \cdot n)$ time, where m, n represent the numbers of edges and vertices, respectively. Those of ordinary skill in the art will recognize that big O notation is used in the art to provide asymptotic upper bound estimates on the growth rate, or order, of a certain function, based on only those factors which contribute most significantly to that function's growth rate.

As noted, the detection system 10 operates in such manner as to avoid duplication of triangle neighbors, with its processing of degree-ordered of triangles ensures that each triangle in G is detected at most one time. This significantly mitigates the computations needed to discover all triangles and detect the triangle neighbors of all connected vertices in G.

That is, the detection system 10 iterates over degree-ordered edges and detects triangle neighbors using degree-ordered set intersections, and a simple array for each vertex is used to mark triangle neighbors identified from set intersection computations. Each reduced neighborhood of a connected vertex $N_A(v)$ is a subset of its overall neighborhood $N(v)$, so $N(v)$ may be a concatenation of $N_A(v)$ and the remaining neighbors, given some marker for delineation. The main computational load of the detection system 10 involves computing the set intersections, which takes $O(m \cdot \sqrt{m})$ time (asymptotically faster than the direct inefficient approach). Moreover, the set intersection is computed only once for each degree-ordered triangle $\{v, u, w\}$; thus, the triangle is processed only once for both triangle neighborhood identification and triangle counting. A final pass over each $N_A(v)$ to process the triangle neighbors of every v takes only $O(m)$ time. Triangle counts follow naturally and are essentially free in terms of computational load. In certain alternative embodiments and applications involving parallel processing configurations may require computing set intersection twice for each triangle to ensure compliance with synchronization requirements.

Triangle Neighborhood Applications

The detection system 10 serves to provide the essential analytical building blocks for numerous applications in various technical contexts. Several illustrative examples are noted in following paragraphs. These and other applications may be employed in wide ranging contexts like web searching, network routing, or simply identifying influential individuals in society and media, just to name a few.

Triangle Centrality

The concept of central or important vertices of a graph G is well known in the art, as are various centrality measures for parametrically characterizing such central/important vertices. The efficient and exhaustive generation of triangle neighbors and triangle neighborhoods by detection system 10 for all connected vertices a graph G supports the formulation of a newly-developed triangle centrality (TC) measure for discriminating important vertices of G having particularly influential effect on other vertices. The detection system 10 may be suitably implemented in that regard for artificial intelligence or other such practical uses known in the art.

As disclosed in appl. Ser. No. 17/099,986 (directed to "Method of Measuring Triangle Graph Centrality and Ranking Nodes of Interest Based upon Triangle Graph Centrality"), triangle centrality identifies important vertices in a graph G giving due weight to the concentration of triangles surrounding each vertex. An important vertex in triangle centrality tends to be disposed in the midst of numerous triangles, whether included in many triangles or none at all.

The triangle centrality measure for graphs (networks) ranks vertices by dividing the
neighborhood of a vertex v into two sets:
neighbors u in triangle with vertex v, i.e. triangle neighbors neighbors w not in triangles with v, i.e. non-triangle neighbors Identifying Community Structure in Graphs Triangles are known to be important indicators of cohesiveness. The triangle neighbors of a vertex are more likely to be members of a community or social network with that vertex as opposed to the non-triangle neighbors. Expanding the triangle neighborhood of each triangle neighbor can expose a community in the underlying data.

Consider a social network of a person A that includes close family members B, C, D, who in turn have social links to each other. This implies the triangles {A, B, C}, {A, B, D}, {A, C, D}, {B, C, D}. Suppose person A also has acquaintances X, Y, Z who are not known to the family members, and there are no social ties between X, Y, Z themselves. It may be inferred that {A, B, C, D} form a community, specifically the family of A, inclusively. But there lacks any community structure between {A, X, Y, Z}.

Expanding the triangle neighborhood of A's close family members B, C, D will broaden the family network of A. More distant relatives of A may then be found by recursively expanding the triangle neighborhood for each newly included member of the community.

Identifying Spam/Spurious Relationships

An email spammer sends many thousands of emails at random to individuals. In contrast, an individual often emails close associates who also email each other. The spammer would tend to appear as a non-triangle neighbor in the email graph of an individual email network, and therefore readily separable from the triangle neighbors. Operation of the detection system 10 would serve effectively in discriminating unwelcome spammers from welcome associates.

Alternative to Clustering Coefficient

The well-known graph measure of vertex connectivity is given by a clustering coefficient, defined as the fraction (quotient) of the triangle count with respect to the maximum triangle count for a vertex. But the clustering coefficient could undervalue the fraction of triangle neighbors for a vertex because a high clustering coefficient requires the neighbors to be in triangles with each other and the vertex. Alternatively, the percentage of triangle neighbors over all neighbors of a vertex can be a strong indicator of how closely tied a vertex is to its neighbors, without each neighbor being in a triangle with the other neighbors. Given a vertex v with neighbors a, b, c, d:

Suppose v is in two triangles, {v, a, b} and {v, c, d} .
Observe that neighbors a and b are in a separate triangle with v from the triangle containing c and d. Then the clustering coefficient cc(v)=2/binom(4, 2)=⅓, which suggests very low connectivity among the neighborhood. In contrast, the fraction of triangle to non-triangle neighbors is 4/4=1, which indicates that 100% of v's neighbors are each in a triangle with v.

The clustering coefficient is a number and does not indicate which neighbors of a vertex are in a triangle with that vertex. The detection of existing triangle neighbors and triangle neighborhood of the vertex by detection system 10 remedies this deficiency.

EXAMPLES

Referring now to FIG. 7, a table is shown listing various sample graphs for illustrative comparison. The listed samples are examples of graphs known in the art for modelling certain real-world networks/databases in various contexts, which were the subjects of respective published studies. Various centrality measures were computed on the sample graphs (including betweenness (BC), closeness (CC), degree (DC), eigenvector (EV), and PageRank (PR) centralities) to demonstrate the efficacy of triangle centrality (TC) relative thereto. Prior to computing the centrality measures the sample graphs were symmetrized, weights and loops were removed, and vertices were labeled numerically in sequence from 1 . . . n without gaps, hence obtaining simple, undirected and unweighted graphs. There was a plurality of agreement between triangle centrality and the other measures in many of these graphs, thus giving support to efficacy of triangle centrality.

Figure 6A:
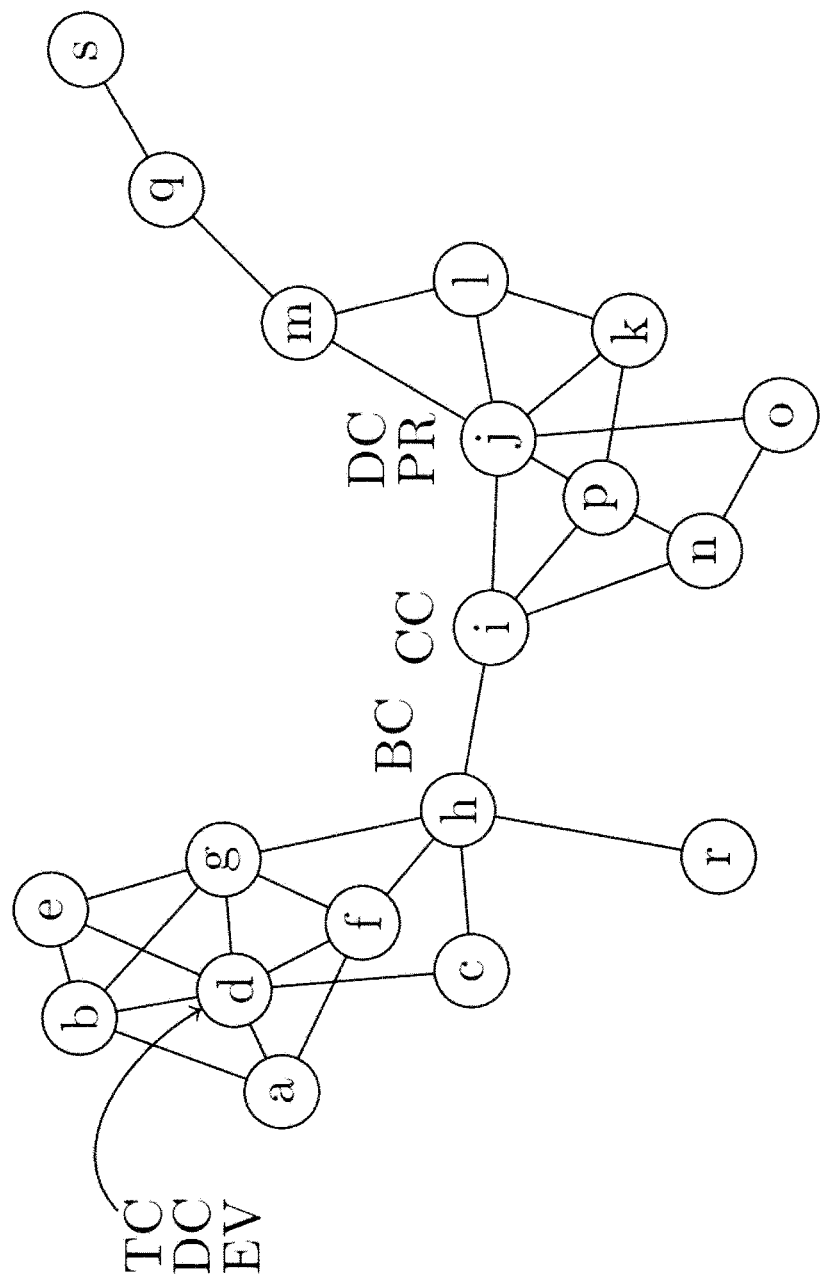
FIG. 6A is a schematic diagram showing a sample graph modelling a certain network for illustrative application of the embodiment shown in FIG. 2 to detect triangle neighbors of the network's nodes or data elements.
Figure 6B:
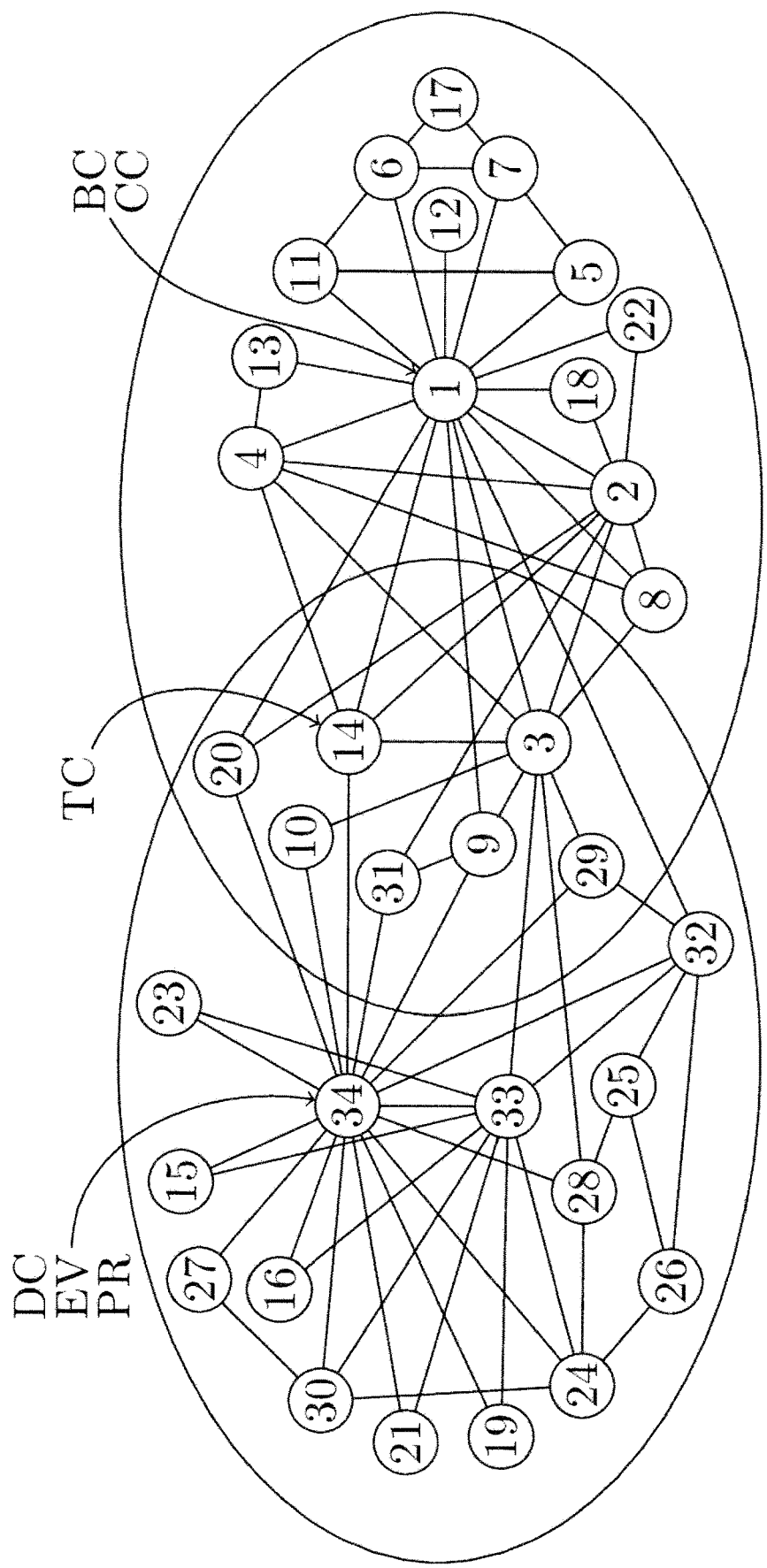
FIG. 6B is a schematic diagram showing a sample graph modelling a certain karate club social network for illustrative application of the embodiment shown in FIG. 2 to detect triangle neighbors of the social network's nodes or data elements.
Figure 6C:
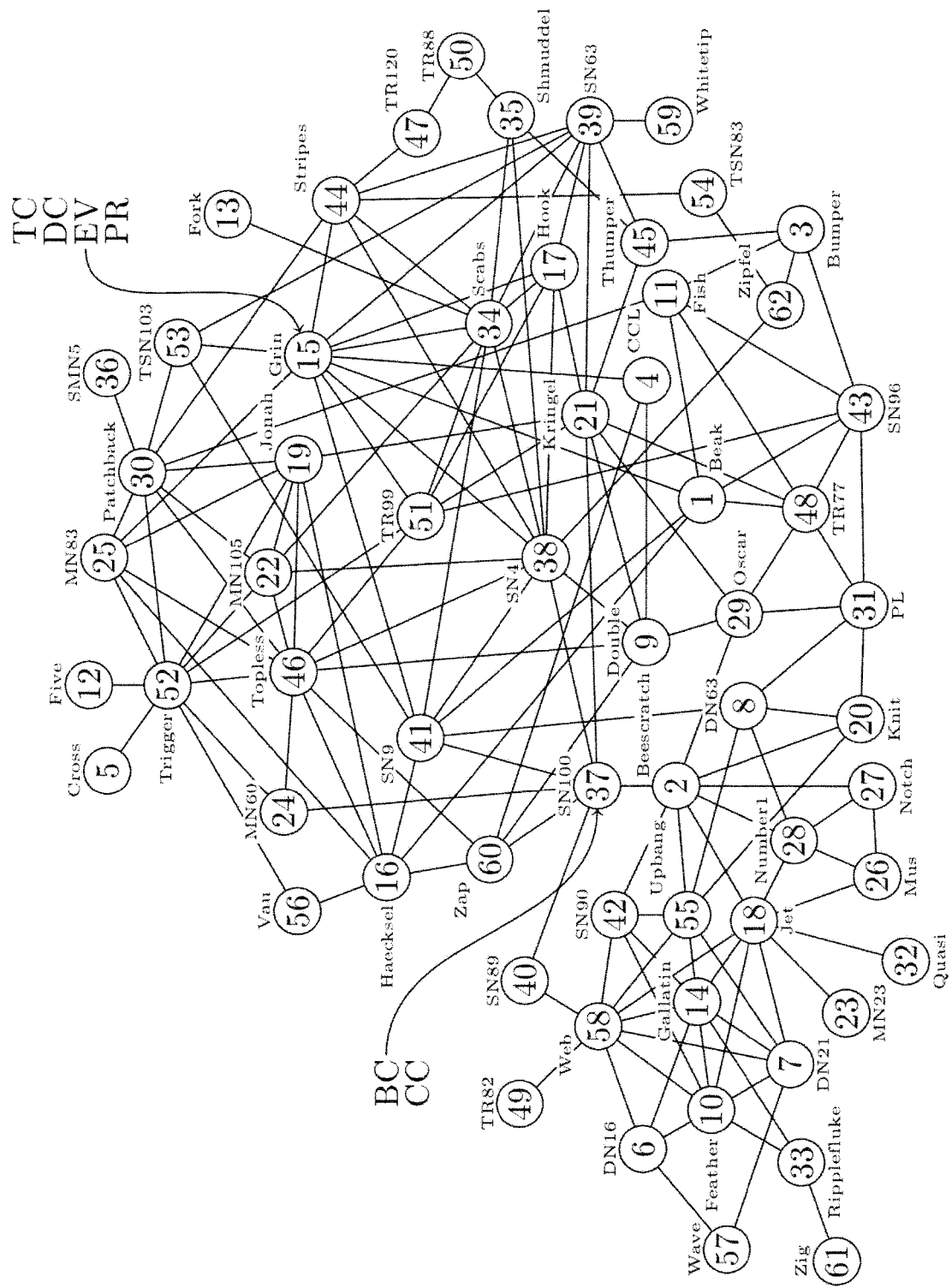
FIG. 6C is a schematic diagram showing a sample graph modelling a certain social network of bottlenose dolphins within a particular geographic region for illustrative application of the embodiment shown in FIG. 2 to detect triangle neighbors of the social network's nodes or data elements; and, FIG. 7 is a table comparatively listing for illustrative reference sample graphs known in the art which model certain real-world networks/databases in various contexts.

Several of the sample graphs for relatively smaller networks are illustrated in FIGS. 6A-6C to aid in visual comparisons of the various centralities. If names of nodes in these networks were known, numeric vertex labels corresponding to the lexicographic ordering on names were accordingly assigned. In these FIGS. 6A-6C, the highest-ranked vertices are indicated by the centrality measures that ranked them.

FIG. 6A depicts a sample graph modelling a network, which appeared in an article published by Borgatti in 2006. In this sample graph, the number of edges (m) is 32, and the number of vertices (n) is 19. Interestingly, four of the 19 vertices, or more than 20% of the vertices, were determined to be central according to certain centrality measures then described in the article. There appear to be two clusters that could be disconnected if the vertex ranked highest by the betweenness or closeness centralities were removed. But there was majority agreement among the centrality measures on the vertex ranked highest now by the triangle centrality.

As shown in FIG. 7, a total of 13 triangles were found in the sample graph (Borgatti) of FIG. 6A. Methodically taking the direct edge-by-edge or vertex-by-vertex approach to detecting triangle neighbors would have consumed an asymptotic computation time approaching $O(m \cdot n) = O(32 \times 19) \rightarrow \sim 608$ time units. The detection system 10 would in contrast consume a significantly mitigated asymptotic computation time approaching $O(m \cdot \sqrt{m}) = O(32 \times \sqrt{32}) \rightarrow \sim 181$ time units.

FIG. 6B depicts a sample graph modelling a certain karate club social network, which appeared in a paper published by Zachary in 1977. This is a well-studied network and serves as a benchmark for clustering and community detection. The network was constructed by Zachary after observing 34 members in a karate club from 1970 to 1972. Following a dispute between the instructor (vertex 1) and administrator (vertex 34), the karate club network split into two respective communities. The instructor and administrator were ranked highest by all the centrality measures except for triangle centrality. The triangle centrality was alone in ranking vertex 14 as the most central. Vertex degree plays a significant role in this network. The instructor and administrator have the two highest degrees in the graph, respectively degree values 16 and 17. In contrast, vertex 14 has degree 5. These rankings were generated based on the topology of the graph. Thus, while the functional roles of the karate club's two main adversaries imply their influence, it may be that vertex 14 actually turns out to be more important from a structural standpoint. In addition to vertex 14 being central with respect to the triangles detected in this sample graph, it also connects the two split communities and appears in the overlap between them.

As shown in FIG. 7, a total of 45 triangles were found in the sample graph (Zachary's) of FIG. 6B. Methodically taking the direct edge-by-edge or vertex-by-vertex approach to detecting triangle neighbors for this sample graph would have consumed an asymptotic computation time approaching $O(m \cdot n) = O(78 \times 34) \rightarrow \sim 2,652$ time units. The detection system 10 would in contrast consume a significantly mitigated asymptotic computation time approaching $O(m \cdot \sqrt{m}) = O(78 \times \sqrt{78}) \rightarrow \sim 689$ time units.

FIG. 6C depicts a sample graph modelling a social network of 62 bottlenose dolphins living off Doubtful Sound in New Zealand between 1994 and 2001, which appeared in a paper published by Lusseau et al. in 2003. This is another benchmark network for clustering detection. According to Lusseau et al. and others, the disappearance of one dolphin, named SN100 (vertex 37), split the network into two communities, but when SN100 reappeared the communities rejoined. Not surprisingly, SN100 is considered the most central by the betweenness and closeness centralities. But it is the dolphin named Grin (vertex 15) that is ranked highest by the remaining centralities, including triangle centrality. Grin also has the highest degree in the graph.

As shown in FIG. 7, a total of 95 triangles were found in the sample graph (Lusseau's) of FIG. 6C. Methodically taking the direct edge-by-edge or vertex-by-vertex approach to detecting triangle neighbors for this sample graph would have consumed an asymptotic computation time approaching $O(m \cdot n) = O(159 \times 62) \rightarrow \sim 9,858$ time units. The detection system 10 would in contrast consume a significantly mitigated asymptotic computation time approaching $O(m \cdot \sqrt{m}) = O(159 \times \sqrt{159}) \rightarrow \sim 2,005$ time units. Note that the degree of computational mitigation attributable to the detection system

10 is considerable for the analytical processing of sample graphs for such relatively smaller networks/databases listed in the table of FIG. 7. The degree of computational mitigation increases dramatically for sample graphs of the larger networks/databases listed. In the case of the Watts-Strogatz power grid network (no. 12), for instance, the sample graph includes 6,594 edges (m) and 4,941 vertices (n), which form 651 total triangles. This yields asymptotic computation times for the direct unmitigated approach and mitigated approach of detection system 10 to be $O(m \cdot n) = O(6,594 \times 4,941) \rightarrow \sim 34,359,714$ time units and $O(m \cdot \sqrt{m}) = O(6,594 \times \sqrt{6,594}) \rightarrow \sim 535,456$ time units, respectively. This translates to a mitigation factor greater than 64 compared to the unmitigated case.

In the case of the SNAP web-Stanford (no. 17), the sample graph includes 1,992,636 edges (m) and 281,903 vertices (n), which form 11,329,473 total triangles. This yields asymptotic computation times for the direct unmitigated approach and mitigated approach of detection system 10 to be $O(m \cdot n) = O(1,992,636 \times 281,903) \rightarrow \int 561,730$ M time units and $O(m \cdot \sqrt{m}) = O(1,992,636 \times \sqrt{1,992,636}) \rightarrow \sim 2,813$ M time units, respectively. This translates to a mitigation factor of almost 200 compared to the unmitigated case.

Although this invention has been described in connection with specific embodiments and forms thereof, it will be appreciated that various modifications other than those described or mentioned above may be resorted to without departing from the spirit or scope of the invention as defined in the appended claims. For example, functionally equivalent elements may be substituted for those specifically shown and described, certain features may be used independently of other features, and in certain cases, particular locations of elements or particular ordering of method steps or processes may be reversed or interposed, all without departing from the spirit or scope of the invention as defined in the appended claims.

What is claimed is:

1. A method for non-redundant detection of nodes of a network topologically disposed in at least one triangularly linked arrangement, the method comprising:
    topologically modelling a network defined by a plurality of nodes selectively linked to one another for communication in predetermined manner, the network being modelled as a graph defined by a plurality of vertices correspondingly linked to one another by interconnecting edges, the vertices being individually designated by respective labels, wherein a connected vertex is defined by each vertex of the graph directly connected by an edge to at least one other vertex, and each neighbor of a connected vertex is defined by one other connected vertex directly connected by an edge thereto;
    executing a neighborhood generator on a processor to generate a neighborhood dataset in computer readable form for each connected vertex, the neighborhood dataset for a connected vertex containing all neighbors of said connected vertex in the graph, each connected vertex having a degree defined according to the number of neighbors thereof for relative ordering by degree;
    executing a neighborhood reduction unit on a processor to adaptively trim the neighborhood dataset of each connected vertex to remove therefrom any neighbor of lower order than said connected vertex, and thereby form a reduced neighborhood dataset for said connected vertex;
    executing a triangle neighbor detection unit on a processor to form a plurality of triangle neighborhood datasets from the reduced neighborhood datasets populated with at least one neighbor, said triangle neighbor detection unit executing to:
        pairwise compare a populated reduced neighborhood dataset of each connected vertex with each populated reduced neighborhood dataset of every higher order neighbor thereof, to detect any common neighbor in the respective reduced neighborhood datasets compared; and,
        responsive to detection of a common neighbor in the pairwise comparison, forwardly update the triangle neighborhood dataset for each of the connected vertex and higher order neighbor in the pairwise comparison to include the detected common neighbor as a triangle neighbor, and forwardly update the triangle neighborhood dataset of at least one of the connected vertex and higher order neighbor in the pairwise comparison to include the other as a triangle neighbor; and,
        reverse update the triangle neighborhood datasets for selected ones of the connected vertices to include therein every other connected vertex of lower order identifying the selected connected vertex as a triangle neighbor;
    the method thereby discriminately detecting coactively grouped nodes of the network exhibiting heightened mutual cohesiveness within the network.

2. The method as recited in claim 1, wherein any neighbors within each neighborhood dataset having matched degrees are ordered relative to one another according to the labels thereof.

3. The method as recited in claim 1, wherein said triangle neighbor detection unit is configured to guard against duplicate inclusion of a triangular neighbor in forwardly updating a triangle neighborhood dataset.

4. The method as recited in claim 1, wherein each of the connected vertices is selected for reverse updating of the triangle neighborhood dataset thereof.

5. The method as recited in claim 1, wherein said triangle neighbor detection unit selectively executes reverse updating of triangle neighborhood datasets for viable ones of higher order neighbors with respect to viable ones of connected vertices, a viable connected vertex for reverse updating having a non-empty triangle neighborhood dataset upon forward updating, and a viable higher order neighbor said viable connected vertex being a higher order neighbor thereof identified as a triangle neighbor in the triangle neighborhood of one or more connected vertices upon forward updating.

6. The method as recited in claim 1, wherein upon detection of a common neighbor in a pairwise comparison, the triangle neighborhood dataset for the pairwise compared connected vertex is updated to include the higher order neighbor compared with as a triangle neighbor.

7. The method as recited in claim 1, wherein each connected vertex identified as a neighbor in the reduced neighborhood dataset of at least one other connected vertex is selected for reverse update of the triangle neighborhood dataset thereof, the triangle neighborhood dataset being reverse updated to include every other lower ordered connected vertex identifying said selected connected vertex as a triangle neighbor.

8. A system for non-redundant detection of nodes of a network topologically disposed in at least one triangularly linked arrangement, comprising:
   a graphing unit executed on a processor, said graphing unit being configured to topologically model a network defined by a plurality of nodes selectively linked to one another for communication in predetermined manner, the network being modelled as a graph defined by a plurality of vertices correspondingly linked to one another by interconnecting edges, the vertices being individually designated by respective labels, wherein a connected vertex is defined by each vertex of the graph having a direct edge connection to at least one other vertex, and each neighbor of a connected vertex is defined by one other connected vertex directly connected by an edge thereto;
   a neighborhood generator executed on a processor and coupled to said graphing unit, said neighborhood generator being configured to generate a neighborhood array in computer readable form for each connected vertex, the neighborhood array for a connected vertex containing all neighbors of said connected vertex in the graph, each connected vertex having a degree defined according to the number of neighbors thereof, the neighbors within each neighborhood array being sorted for ordering by degree; and,
   a neighborhood reduction unit executed on a processor and coupled to said neighborhood generator, said neighborhood reduction unit being configured to adaptively filter the neighborhood array of each connected vertex to remove therefrom any neighbor of lower sorted order than said connected vertex, said neighborhood reduction unit thereby forming a reduced neighborhood array for said connected vertex; and,
   a triangle neighbor detection unit executed on a processor and coupled to said neighborhood reduction unit, said triangle neighbor detection unit forming a plurality of triangle neighborhood arrays from the reduced neighborhood arrays populated with at least one neighbor, said triangle neighbor detection unit including:
      a forward detection portion configured to:
         pairwise compare a populated reduced neighborhood array of each connected vertex with each populated reduced neighborhood array of every higher order neighbor thereof, to detect any common neighbor in the respective reduced neighborhood arrays compared; and,
         responsive to detection of a common neighbor in the pairwise comparison, forwardly updating the triangle neighborhood array for each of the connected vertex and higher order neighbor in the pairwise comparison to include the detected common neighbor as a triangle neighbor, and forwardly updating the triangle neighborhood array of at least one of the connected vertex and higher order neighbor in the pairwise comparison to include the other as a triangle neighbor; and,
      a reverse detection portion configured to reverse update the triangle neighborhood arrays for selected ones of the connected vertices to include therein every other connected vertex of lower order identifying the selected connected vertex as a triangle neighbor;
   the system thereby discriminately detecting coactively grouped nodes of the network exhibiting heightened mutual cohesiveness within the network.

9. The system as recited in claim 8, wherein any neighbors within each neighborhood array having matched degrees are ordered relative to one another according to the labels thereof.

10. The system as recited in claim 8, wherein upon detection of a common neighbor in a pairwise comparison, the triangle neighborhood array for the pairwise compared connected vertex is updated to include the higher order neighbor compared with as a triangle neighbor.

11. The system as recited in claim 8, wherein each connected vertex identified as a neighbor in the reduced neighborhood array of at least one other connected vertex is selected for reverse update of the triangle neighborhood array thereof, the triangle neighborhood array being reverse updated to include every other lower ordered connected vertex identifying said selected connected vertex as a triangle neighbor.

12. The system as recited in claim 8, wherein each of the connected vertices is selected for reverse updating of the triangle neighborhood array thereof.

13. The system as recited in claim 8, wherein the reduced neighborhood and triangle neighborhood arrays of the same connected vertex include matching indices for addressing the neighbors and triangle neighbors respectively contained therein, a higher order neighbor of said connected vertex addressed by a corresponding index in the reduced neighborhood array being thereby addressed by the same index in the triangle neighborhood array upon detection as a triangle neighbor of said connected vertex.

14. The system as recited in claim 13, wherein the triangle neighborhood array includes a plurality of digital bits respectively addressed therein, the digital bits being initialized to a first digital state then selectively set to a second state responsive to detection of corresponding neighbors of the reduced neighborhood array as triangle neighbors by said triangle neighbor detection unit.

15. A method for detection of data elements of a database topologically disposed in at least one triangularly linked arrangement, the method comprising:
   topologically modelling a database as a graph, the database containing a plurality of data elements selectively linked to one another for functional association in predetermined manner, the graph including a plurality of vertices correspondingly linked to one another by interconnecting edges, wherein the vertices are individually designated by respective labels, a connected vertex is defined by each vertex of the graph directly connected by an edge to at least one other vertex, and each neighbor of a connected vertex is defined by one other connected vertex directly connected by an edge thereto;
   executing a neighborhood generator on a processor to generate a neighborhood dataset in computer readable form for each connected vertex, the neighborhood dataset for a connected vertex containing all neighbors of said connected vertex in the graph, each connected vertex having a degree defined according to the number of neighbors thereof;
   executing a neighborhood reduction unit on a processor to form a plurality of reduced neighborhood datasets from said neighborhood datasets, the neighbors within each reduced neighborhood dataset being sorted in order by degree, with any neighbors having matched degrees being ordered relative to one another according to the labels thereof, said neighborhood reduction unit adaptively filtering the neighborhood dataset of each connected vertex to remove therefrom any neighbor of lower sorted order than said connected vertex in forming the reduced neighborhood dataset for said connected vertex;

executing a triangle neighbor detection unit on a processor to form a plurality of triangle neighborhood datasets from the reduced neighborhood datasets, said triangle neighbor detection unit executing to:

pairwise compare the respective reduced neighborhood datasets for each forwardly directed combination of each connected vertex with every neighbor thereof having a higher sorted order, for detection of any dataset intersection at a common neighbor; and, responsive to detection of dataset intersection in the pairwise comparison, forwardly updating the triangle neighborhood dataset for each of the pairwise compared connected vertex and compared neighbor thereof with each common neighbor as a triangle neighbor, and forwardly updating the triangle neighborhood dataset of at least one of the pairwise compared connected vertex and compared neighbor to include the other as a triangle neighbor; and, reverse updating the triangle neighborhood datasets for selected ones of the connected vertices to include to include therein every other connected vertex of lower sorted order identifying the selected connected vertex as a triangle neighbor;

the method thereby discriminately detecting coactively grouped data elements of the database exhibiting heightened mutual cohesiveness within the database.

16. The method as recited in claim 15, wherein each connected vertex identified as a neighbor in the reduced neighborhood dataset of at least one other connected vertex is selected for reverse update of the triangle neighborhood dataset thereof, the triangle neighborhood dataset being reverse updated to include every other lower ordered connected vertex identifying said selected connected vertex as a triangle neighbor.

17. The method as recited in claim 15, wherein said triangle neighbor detection unit is configured to guard against duplicate inclusion of a triangular neighbor in forwardly updating a triangle neighborhood dataset.

18. The method as recited in claim 15, wherein each of the connected vertices is selected for reverse updating of the triangle neighborhood dataset thereof.

19. The method as recited in claim 15, wherein upon detection of dataset intersection in a pairwise comparison, the triangle neighborhood dataset for the pairwise compared connected vertex is updated to include the compared neighbor as a triangle neighbor.

20. The method as recited in claim 15, wherein pairwise comparison is made only between reduced neighborhood datasets populated with at least one neighbor.

* * * * *

UNITED STATES PATENT AND TRADEMARK OFFICE
CERTIFICATE OF CORRECTION

PATENT NO. : 11,841,904 B1
APPLICATION NO. : 17/534660
DATED : December 12, 2023
INVENTOR(S) : Paul Burkhardt It is certified that error appears in the above-identified patent and that said Letters Patent is hereby corrected as shown below:

In the Specification

Column 10, Line 50, the terms "vertices $v$ or a" should correctly read -- vertices $v$ or $u$ --.

Column 10, Line 60, the terms "connected vertex $v$ and its neighbor a" should correctly read -- connected vertex $v$ and its neighbor $u$ --.

Column 12, Line 39, the terms "connected vertices $v$ of $V$as storage arrays" should correctly read -- connected vertices $v$ of $V$ as storage arrays --.

Column 13, Line 60, the terms "compared vertices $v$, a would have" should correctly read -- compared vertices $v$, $u$ would have --.

Column 15, Line 22, the terms and characters "neighborhoods $\rightarrow N_\pi$" should correctly read -- neighborhoods $\rightarrow N_\Delta$ --.

Column 15, Line 24, the terms and characters "neighborhoods $\leftarrow N_\pi$" should correctly read -- neighborhoods $\leftarrow N_\Delta$ --.

Column 16, Line 29, the terms "reduced neighborhood $N_\pi c)$" should correctly read -- reduced neighborhood $N_\pi(c)$ --.

Column 16, Lines 44-45, the terms and characters "triangle neighborhoods $\rightarrow N_\Delta(l), \rightarrow N_\Delta(l), \rightarrow N_\Delta(b)$" should correctly read -- triangle neighborhoods $\rightarrow N_\Delta(j), \rightarrow N_\Delta(l), \rightarrow N_\Delta(b)$ --.

Column 17, Line 5, the terms "arrays $N(b), N_\Delta(b), N_\Delta(b), L_b$" should correctly read -- arrays $N(b), N_\pi(b), N_\Delta(b), L_b$ --.

Column 17, Line 10, the terms "arrays $N_\Delta(b)$ and $L_b$" should correctly read -- arrays $N_\pi(b)$ and $L_b$ --.

Signed and Sealed this
Second Day of July, 2024

Katherine Kelly Vidal
*Director of the United States Patent and Trademark Office*

CERTIFICATE OF CORRECTION (continued)
U.S. Pat. No. 11,841,904 B1

Column 17, Line 58, the terms "connected vertex $N_\Delta(v)$" should correctly read -- connected vertex $N_\pi(v)$ --.

Column 17, Line 59, the terms "concatenation of $N_\Delta(v)$" should correctly read -- concatenation of $N_\pi(v)$ --.

Column 18, Line 1, the terms "each $N_\Delta(v)$" should correctly read -- each $N_\pi(v)$ --.

Column 18, Lines 44-46, the terms and characters "neighbors $u$ in triangle with vertex $v$, i.e. triangle neighbors neighbors $w$ not in triangles with $v$, i.e. non-triangle neighbors" should correctly read:
-- • neighbors $u$ in triangle with vertex $v$, i.e. triangle neighbors
• neighbors $w$ not in triangles with $v$, i.e. non-triangle neighbors --.

Column 21, Lines 33-34, the terms and characters "ʃ561,730 M time units" should correctly read -- ~561,730 M time units --.